United States Patent [19]
Velazquez

[11] Patent Number: 5,255,936
[45] Date of Patent: Oct. 26, 1993

[54] REAR SUSPENSION ASSEMBLY

[75] Inventor: Alfonso B. Velazquez, Hidalgo, Mexico

[73] Assignee: Dina Autobuses, S.A. De D.V., Mexico

[21] Appl. No.: 871,798

[22] Filed: Apr. 20, 1992

[30] Foreign Application Priority Data

Apr. 19, 1991 [MX] Mexico ................................. 25446

[51] Int. Cl.⁵ .............................................. B60G 11/24
[52] U.S. Cl. .................................... 280/717; 280/723; 267/277
[58] Field of Search ............... 280/688, 717, 716, 723, 280/700, 713; 267/277, 278, 279, 281, 154, 153

[56] References Cited

U.S. PATENT DOCUMENTS

| | | | |
|---|---|---|---|
| 2,325,132 | 7/1943 | Haushalter | 267/281 |
| 2,330,482 | 9/1943 | Fageol | 280/717 |
| 2,824,734 | 2/1958 | Linn et al. | 267/281 |
| 3,773,347 | 11/1973 | Traylor | 280/713 |
| 4,033,605 | 7/1977 | Smith et al. | 280/723 |
| 4,738,467 | 4/1988 | Orndorft, Jr. et al. | 267/280 |
| 5,046,752 | 9/1991 | Stephens et al. | 280/713 |

FOREIGN PATENT DOCUMENTS 1556171 11/1979 United Kingdom ................ 267/154

Primary Examiner—Karin L. Tyson
Attorney, Agent, or Firm—Roylance, Abrams, Berdo & Goodman

[57] ABSTRACT

A rear suspension assembly for buses and other vehicles has a square rubber torque spring, whose particular construction and components favorably increase the load capacity of the bus, result in a reduction of maintenance time and better safety and comfort conditions during operation of the bus. The rear suspension includes an upper support and a complementary lower support to clamp the rubber torque spring and attach the spring to the vehicle frame. The upper and lower supports are united by a pair of U-shaped clamps. The U-shaped clamps extend through a lower mounting seat to fasten the spring and the upper and lower supports with a rear axle of the bus by hexagonal self-locking nuts. The assembly is joined to the bus body by a pair of suspension arms extending between the spring and a coupling mounted on the vehicle frames. The rear suspension assembly also includes a pair of adjustment levers connected to hexagonal blocks provided on each end of the square torsion spring. Brackets extend from the upper support connecting a pair of shock absorbers from the vehicle frame to the spring assembly.

14 Claims, 5 Drawing Sheets

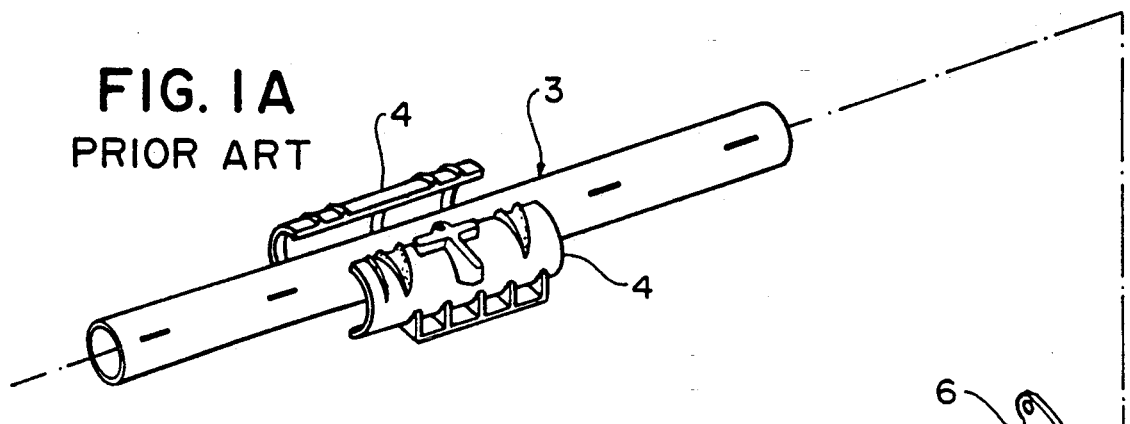
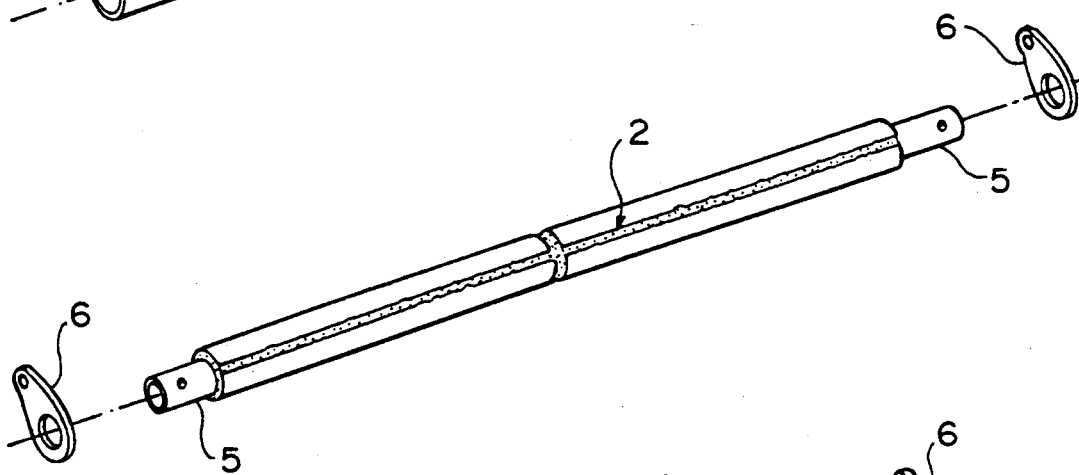
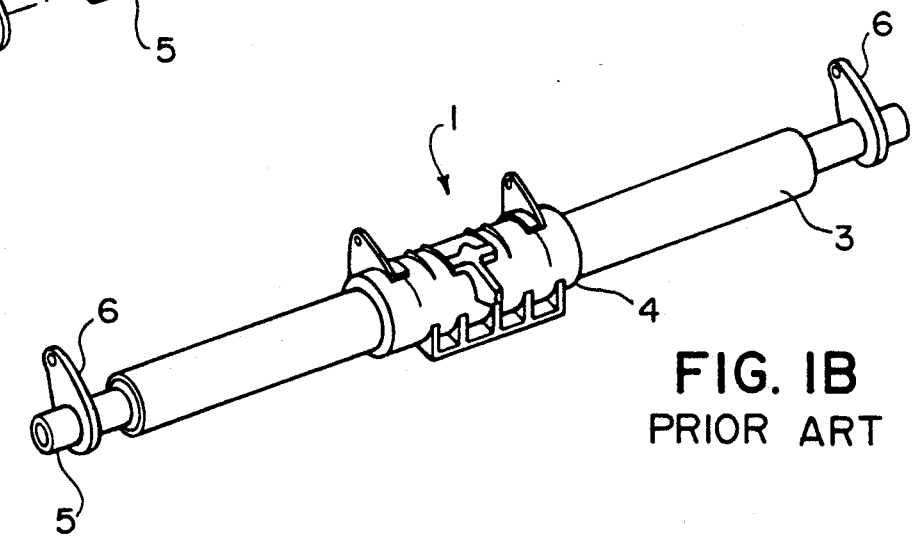

REAR SUSPENSION ASSEMBLY

FIELD OF THE INVENTION

The present invention relates to a torsion spring suspension assembly. More particularly, the invention is directed to a rear torsion spring suspension assembly having an adjustable tensioning arm.

BACKGROUND OF THE INVENTION

Rear suspension systems are known which include a circular section rubber torque spring developed by B. F. Goodrich. This type of torsion spring includes a molded, cylindrical, tubular shaped, vulcanized rubber body having an inner cylindrical steel pipe and a steel sheet outer casing substantially as shown in FIGS. 1A and 1B. The spring is represented in FIG. 1A in the disassembled and in the assembled condition in FIG. 1B. FIG. 2 illustrates an end view of the conventional torsion spring assembled on the rear of a vehicle.

The conventional rubber torsion spring assembly 1 shown in FIG. 1A comprises a vulcanized rubber torsion body 2 pressure inserted inside a thin-wall pipe 3. The pipe 3 includes a pair of strong steel shells 4 firmly welded to the pipe 3 to form a support structure for the rear axle. A steel tubular pipe or shaft 5 extends through the rubber body 2 and extends from each end of the rubber body 2. As shown in FIG. 1, the rubber body 2 typically includes a steel sleeve fixed to the rubber body before inserting into the pipe 3.

For the suspension assembly 1 to support the load of the bus, the spring assembly 1 must be tensioned as known in the art. Adjustment levers 6 may be welded on the ends of the steel tubular shaft 5. To form the complete rear suspension for a vehicle, two spring assemblies 1 are required, as described above, which are firmly fixed to opposite ends of the rear axle of the vehicle via U-shaped bolts and base plates. The rear axle is rigid and incorporates the differential assembly by means of which the bus is driven.

To complement the suspension assembly 1 and allow relative movement of the axle with respect to the body, the suspension has a pair of arms 7 articulated on each end of the tubular shaft 5 as shown in FIG. 2. An adjustment block 8 sustains the arm 7 via the threaded tension member 9 and positions the arm 7 relative to the vehicle whereby the height of the vehicle body is adjusted in relation to the ground when the spring undergoes normal relaxation due to use.

The suspension assembly 1 also incorporates four couplings 10, each comprising a rubber lined steel core and a casing. Each coupling 10 is joined to the arm 7 and the support 11 of the vehicle body. The rubber lined steel core of the coupling 10 isolates the vibration of the tires and also allows pivotal movement to permit movement of the axle in relation to the body, or of the body in relation to the axle, as in conventional suspension systems.

Although the above-described assembly of circular section rubber torque springs satisfactorily meets the fundamental safety and comfort requirements for proper operation of the bus, this system has the inconvenience that once the tension member 9 thread is used up, which allows adjustment of the springs, the adjustment levers 6 of the springs have to be removed from the steel shaft 5 and welded again in another angular position on the ends of the tubular steel shaft 5 to compensate for the permanent, progressive deformation of the rubber body that occurs with use. The process of welding the adjustment levers 6 to the tubular shaft 5 results in application of heat, thereby damaging the rubber body near the end of the shaft causing a reduction in its use life.

Another inconvenience of the conventional rear suspension assembly is the excessive time required in replacing the spring assembly when they must be removed at the end of their useful life. The replacement operation of these spring assemblies requires the use of a press to pull or push the rubber torsion spring inside the steel core and require the availability of a machine shop.

SUMMARY OF THE INVENTION

It is an object of the invention to provide an improved rear suspension assembly comprising the square rubber torsion spring, with greater useful life of all the components.

Another object of the suspension assembly is to provide a particular structure that facilitates maintenance of its components, thereby reducing the service time of the vehicle and the operating expense.

A further object of the invention is to provide a suspension assembly whose component parts provide greater load capacity and concurrently increase the safety and reliability of the suspension.

A further object of the invention is to provide a simple mounting suspension assembly which does not require special machinery and tools for installation and assembly of its components and for mounting in the vehicle.

Another object of the invention is to provide a suspension assembly having adjustment levers that can be removed from the steel torsion spring without the need for specialized tools. An additional advantage of the improved suspension assembly is the ability to retighten the springs, thereby increasing the operating life.

The above advantages and objects of the invention are basically attained by providing a rear torsion suspension assembly comprising: an elongated shaft having first and second ends and a substantially circular cross-sectional shape; first and second lug means fixed to said shaft and spaced from said first and second ends; a vulcanized, solid, rubber torsion body surrounding and fixed to said shaft between said first and second lug means, said rubber body having a substantially square cross-section; a rigid sheath surrounding said rubber body having a substantially square cross-section, said sheath having at least two opposing faces and means defining an aperture in said faces; bolt means extending through said aperture in said sheath, said bolt means engaging said rubber body to resist movement of the rubber body with respect to the sheath; means for rigidly coupling said sheath to an axle of a vehicle; first and second tension adjusting arms coupled to each of said lugs, said tension arms extending radially outward from said shaft; first and second suspension arms having a first end coupled to each end of said shaft adjacent said lugs, and a second end of each suspension arm being further coupled to a frame of said vehicle; and adjustable tension means coupled to said tension arm and to said suspension arm to adjust the angular position of said shaft with respect to said suspension arm.

The above-mentioned advantages and some others will be apparent throughout the following detailed description of the new rear suspension, making reference for clearer interpretation, to the drawings of the invention which are also included as part of the description.

BRIEF DESCRIPTION OF THE DRAWINGS

The following is a brief description of the drawings which form a part of this disclosure.

FIGS. 1A and 1B are a representation of the conventional circular torque spring of the prior art in the unmounted and mounted condition;

DETAILED DESCRIPTION OF THE INVENTION

Figure 2:
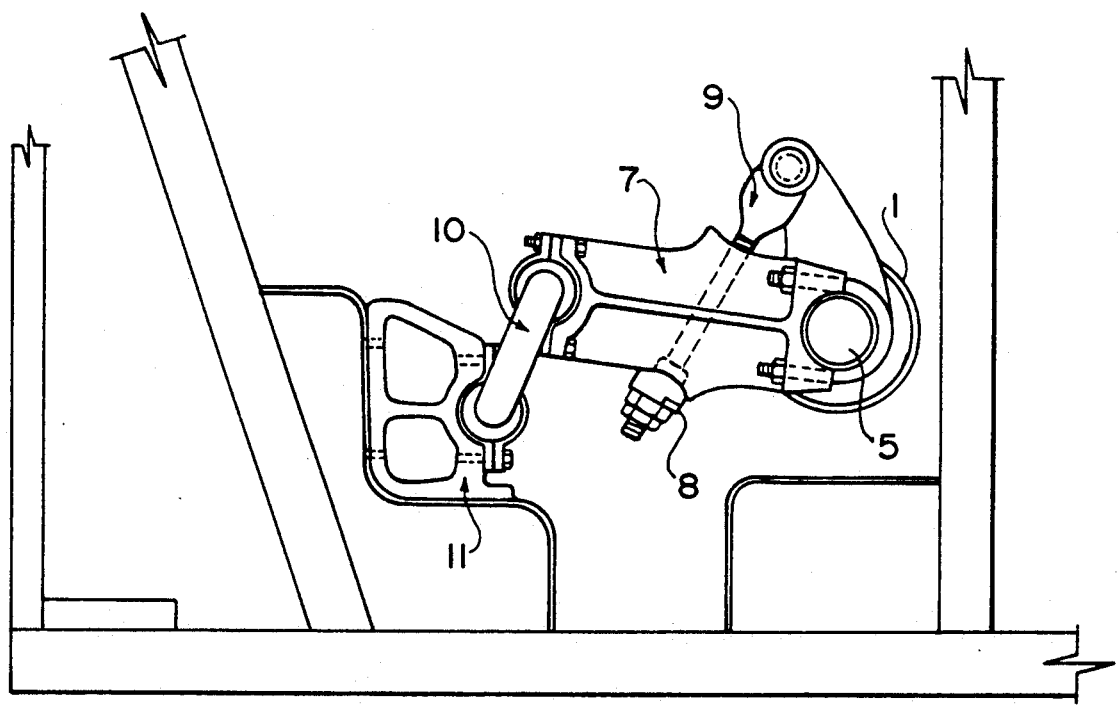
FIG. 2 is a side view, also of the conventional rear suspension, where some other constituent elements are shown.
Figure 3:
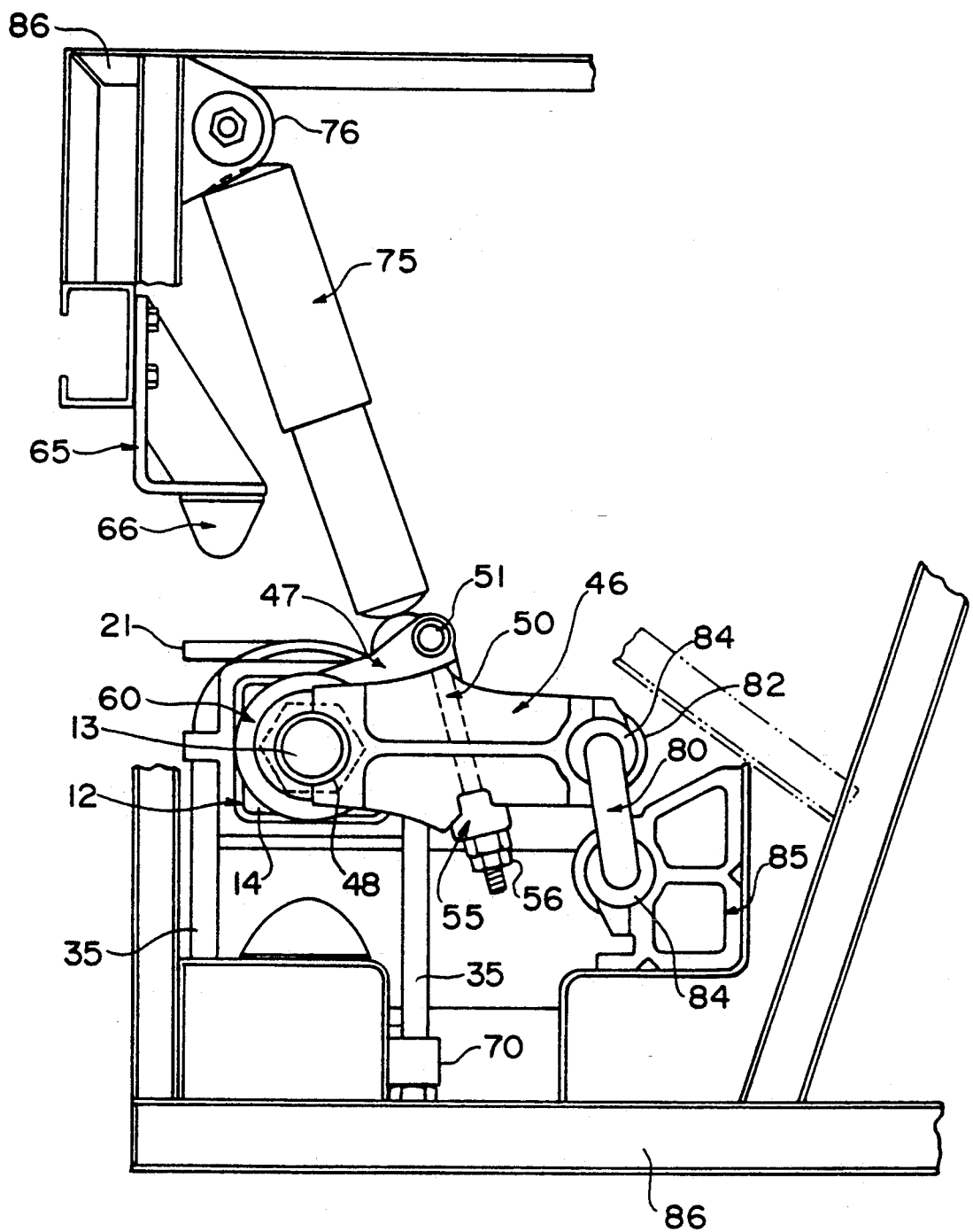
FIG. 3 is a side view of the general assembly of the rear suspension with square springs in accordance with the present invention.
Figure 4:
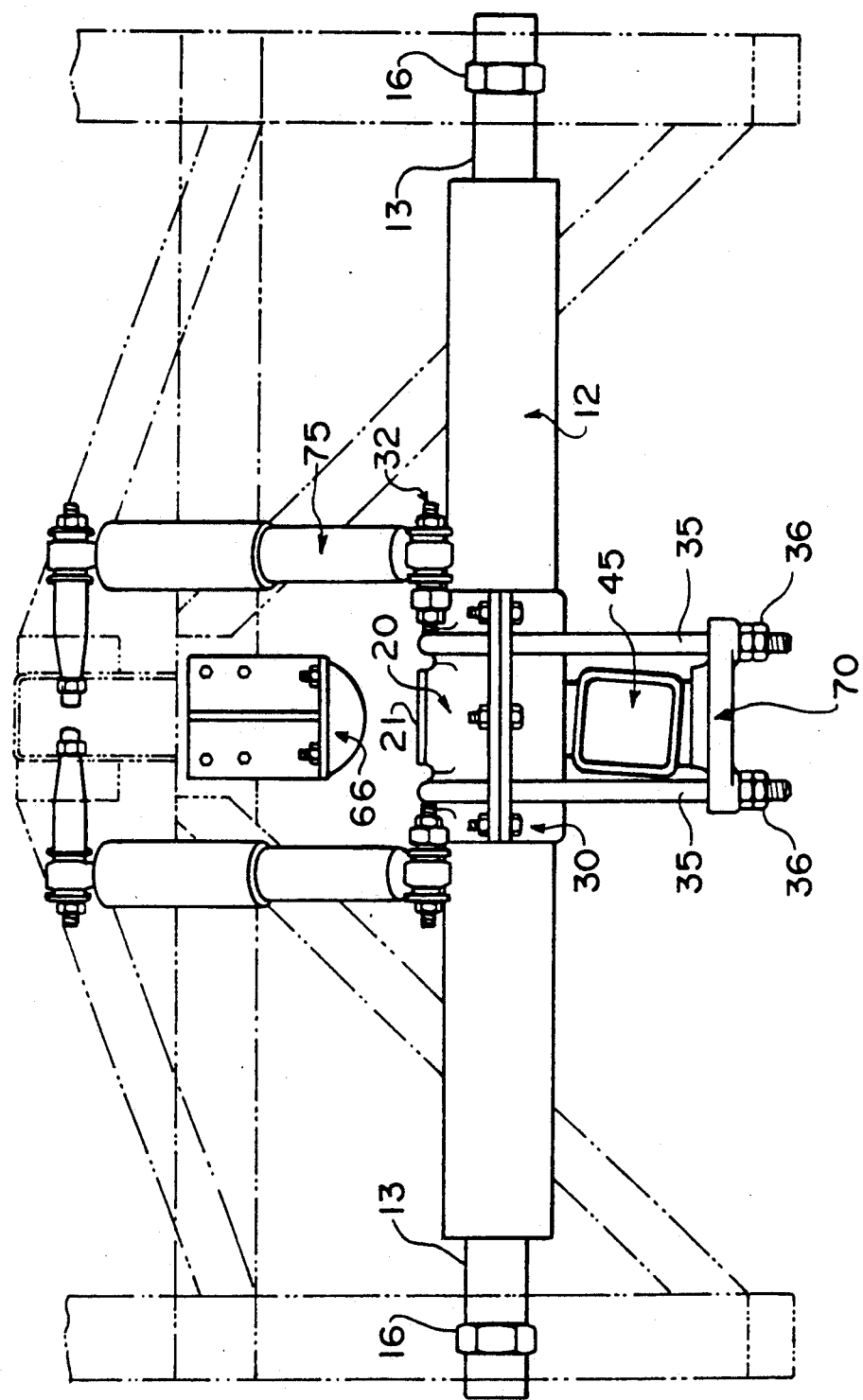
FIG. 4 is a view of such improved suspension in a lateral elevation.
Figure 5:
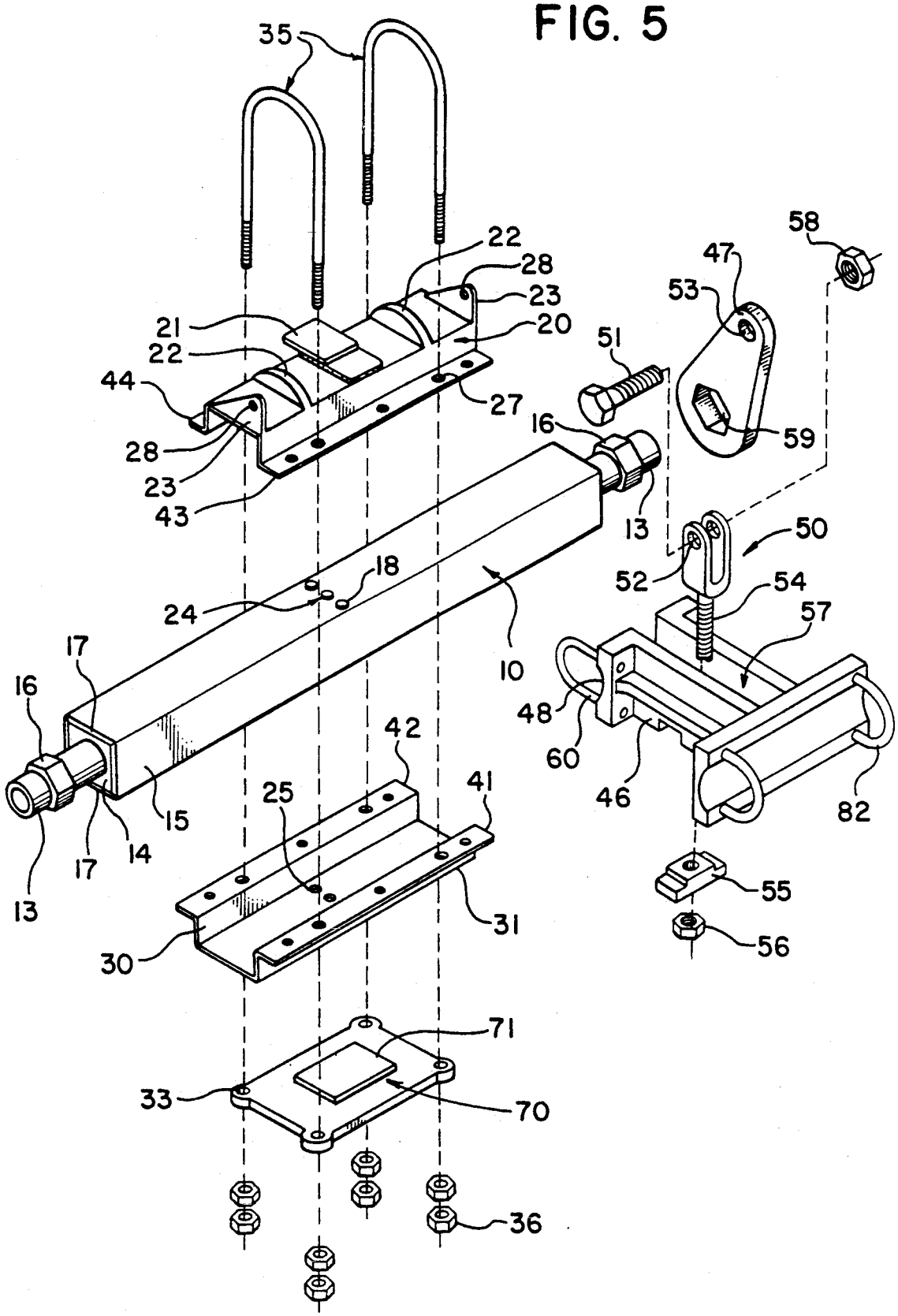
FIG. 5 is a view of the square spring support assembly represented in the component parts.

Referring to FIGS. 3-5 illustrating the improved rear suspension assembly system of the invention, the assembly comprises a square rubber section torque spring assembly 12 for each side of the vehicle that fundamentally allows an increase in load capacity. The rear suspension system of the invention is primarily for use on buses and other heavy vehicles although the system may be suitable for any type of vehicle. The rear suspension system is attained by a square rubber torsion spring assembly 12 coupled to the rear axle 45 of a vehicle by a pair of U-bolts 35. The ends of the torsion spring assembly 12 include a suspension arm 46 which is pivotally coupled by a linkage 80 to the frame 85 of the vehicle to permit limited vertical movement of the axle with respect to the vehicle frame 86.

The square torque spring assembly 12 comprises a round tubular steel shaft or core 13 and a vulcanized torsion spring rubber body 14 of suitable composition having a high torsion resistance. The rubber body 14 is firmly fixed to the steel shaft 13 such that the shaft 13 is not able to freely rotate with respect to the rubber body 14. The rubber body 14 has a square exterior configuration with its ends axially spaced from ends of the shaft 13. Four steel sheet angles 17 are firmly secured to the outer surface of the rubber body 14 to form an inner sheath. The four steel sheet angles 17 are assembled on the rubber body 14 such that the sheet angles join in a central part to form a groove extending around the perimeter of the inner steel sheath. The rubber body 14 and the four steel sheet angles 17 are pressure inserted into an outer steel sheath or cover 15 having a substantially square cross-section. On each end of the steel shaft 13 extending longitudinally from the vulcanized rubber body 14 is a hexagonal lug 16 fastened preferably by welding to allow the torsion spring assembly 12 to be attached to the suspension assembly and to allow the assembly to be tensioned as discussed hereinafter in greater detail.

The resulting torsion spring assembly 12 is assembled by positioning the rubber body 14 within the outer steel sheath 15. The steel sheath has three holes 18 in the central transverse region of two of its opposite faces, which coincide with the peripheral groove defined by the steel sheet angles 17. In a preferred embodiment, the holes 18 include internal threads. In each of the holes 18 of the sheath 15, a bolt 24 is inserted to engage the rubber body 14 and the sheet angles 17 to prevent displacement in any direction between the steel sheath 15 and the vulcanized rubber spring body 14 such that the rubber spring body 14 is allowed to twist when loads are applied to the steel shaft 13 due to the weight of the bus and the differences in the road surface.

To support the square torsion spring assembly 12, a support assembly, as shown in FIG. 4, comprises an upper grooved support 20 made of cast steel coupled with a lower support 30 in a form complementary to the upper support 20. The upper support 20 and the lower support 30 are coupled together by nuts and bolts 40 extending through flanges 41, 42, 43 and 44 of the upper and lower supports 20 and 30.

The upper support 20 has an impact plate 21 on its upper central part that serves to transmit shock impacts on the suspension to an upper butt support 66 on the frame of the vehicle. On each side of the impact plate 21 is a transverse semicircular groove 22 formed in the upper support 20 serving as a seat for a U-bolt type clamp 35. The U-bolts 35 extend around the two supports 20, 30 of the spring assembly 12 and through holes 33 in an axle mounting plate 70. As shown in FIG. 4, the rear axle 45 of the vehicle is clamped between the suspension assembly 12 and the mounting plate 70 positioned below the axle 45 by the U-bolts 35. The U-bolts 35 are secured to the spring assembly 12 and to the axle 45 by washers and nuts 36.

The upper support 20 includes a lug 23 on each end which acts as a support for the shock absorber 75. Each lug 23 has a conical hole 28 to receive a bolt 32 which serves to couple the shock absorber 75 to the lug 23.

The torsion spring assembly 12 receives a plurality of bolts 24 extending through the holes 18 in an upper face and through a lower face in the steel sheath 15 to engage the rubber body 14 to prevent displacement of a vulcanized rubber body 14 with respect to the square steel sheath 15. The heads of the bolts 24 protrude from the upper and lower face of the steel sheath 15. As shown in FIG. 5, the lower support 30 has three transversely aligned holes 25 in the central region which seat the head of the bolts 24 to prevent longitudinal displacements of the spring assembly 12 in relation to the upper support 20 and lower support 30, when stresses are received due to traction, braking or shock from the tires of the rear axle. The upper support 20 includes similar holes to seat the head of the bolts 24 extending from the upper face of the steel sheath 15.

The lower support 30 has a longitudinal channel section design formed of cast steel and which when coupled to the upper support 20 serves as a support for the torsion spring assembly 12. The form and dimensions of the upper support 20 and lower support 30 are symmetrical and are preferably connected to each other, and with the spring assembly 12 by screws, washers and nuts.

The lower support 30 has a plurality of holes 31 in the flanges 41, 42 and the upper support 20 include holes 27 in flanges 43, 44 of a diameter and location that allow the U-bolt clamps 35 to extend through the flanges 41-44 to firmly clamp the upper and lower supports together with the rear axle 45.

The U-bolt clamps 35 comprise U-shaped elements made of high resistance steel material having a threaded end portion such that the upper and lower supports 20 and 30, the rear axle 45, the spring assembly 12 are coupled to the lower mounting plate 70 and the rear axle 45 by hexagonal, self-locking nuts. This type of assembly enables the spring assembly 12 or the rear axle 45 to be easily disassembled from each other without the need for specialized tools or personnel.

The assembly formed by the torsion spring 12, the upper support 20 and lower support 30, the clamps 35 and the lower mounting seat 70 are coupled to the vehicle body by suspension arms 46 coupled to the steel shaft 13. The suspension arms 46 are preferably formed from high impact and tension resistant cast steel. Prior to assembling the suspension arms 46 to the steel shaft 13, removable adjustment levers 47 are placed on the hexagonal blocks 16 on each end of the shaft 13. As shown in FIG. 5, the tensioning arms 47 include a hexagonal aperture 59 complementing the block 16. The adjustment levers 47 are placed on the blocks 16 and are positioned relative to the suspension arms 46 so that the rubber torsion spring body 14 remains under tension when installed on the vehicle. The spring assembly 12 is coupled to the suspension arms 46 by mating a semi-circular recess 48 with the shaft 13 adjacent the lug 16 and clamping the suspension arm 46 to the shaft 13 by a U-bolt clamp 60 with respective self-locking nuts.

Preferably the suspension arms 46 in the zone where it is assembled with the spring assembly 12 have a substantially "H" cross-sectional shape to limit transverse movements between the suspension arms 46 and the shaft 13, which are firmly fixed by means of the U-bolts 60. The opposite end of each suspension arm 46 is also machined to form a semi-circle recess which is assembled with a respective circular section of a coupling or swing linkage 80 by means of U-bolts 82, nuts and washers.

In a central region of each suspension arm 46 is a bore 57 extending transversely through the suspension arm 46 which receives a threaded tension bolt 50. One end of the bolt 50 is connected to the adjustment lever 47, while the other end is coupled to the suspension arm 46 by an adjustment block 55 and a hexagonal, self-locking nut 56.

The tension bolt 50 is an elongated element in the form of a bar or bolt, and made of forged, high tension-resistant steel. The upper end of the bolt includes a yoke or eyelet 52 to define a hole to receive a bolt 51 passing through an aperture 53 in the adjusting lever 47 whereby the tension bolt 50 is coupled to the adjusting lever 47 by the bolt 51 and nut 58. On the other end of the tension bolt 50 is a threaded section 54 that allows it to be assembled with the suspension arm 46 by means of the adjustment block 55 and nut 56. The main function of the tension bolt 55 is to adjust the tension of the rear rubber torque spring assembly 12 by adjusting the relative angular position of the steel shaft 13 with respect to the suspension arm 46 and linkage 80 as discussed hereinafter in greater detail.

The adjustment block 55 comprises a channel shaped piece having a hole in the middle part. The adjustment block 55 engages the suspension arm 46 to support the arm 46 with the tension bolt 50 and allows the tension adjustment of the rear spring. The construction of the adjustment block is of high resistance cast steel.

The U-bolt 60 used to fix the suspension arms 46 to the steel shaft 13 of the spring assembly 12 are round section elements having a U-shape end made of cold rolled high resistance steel. The ends of the U-bolts have threaded portions to receive the bolts. The particular design of these bolts makes the use of special tools for assembly and disassembly unnecessary.

To avoid impacts of metal to metal between the bus body and the suspension assembly 12 when the vehicle encounters especially large obstacles or objects, such as for example, speed bumps, stones, etc., the vehicle frame includes a support for an upper limit 65 which has an angle formed with a central gusset plate welded on both faces, and which includes holes for fastening to the bus structure. The horizontal face of the angle has a rubber butt 66 assembled on the lower face which acts to limit the upward movement of the suspension and prevent shocks of the suspension against the body.

The lower mounting plate 70, which jointly with the clamps 35, fasten the square spring assembly 12 and the supports 20 and 30 to the rear axle 15, comprises an essentially flat section of high impact resistance cast steel provided with a protruding portion 71 in the central region. The mounting plate 70 includes holes 33 in each corner through which the threaded ends of the U-bolts 35 pass.

The suspension assembly 12 is coupled to the vehicle body by rectangular couplings or linkages 80 coupled between the suspension arms 46 and the frame support member 85. The couplings 80 are preferably rectangular shaped having a circular cross-section and are made of high resistance cast steel. Rubber covers 84 having heat high resistance are provided on each end of the couplings 80 between the linkage and the suspension arm 46 and the linkage support 85.

To complement the new rear suspension, shock absorbers 75, of the double action, heavy service, telescopic type are coupled between the spring assembly 12 and the vehicle frame. The shock absorber 75 has a conical eyelet for insertion of rubber bushings. Each shock absorber 75 is fastened to the vehicle frame by a plate support bracket 76 integrated to the bus structure and fastened via a conical bolt with threads on both ends. The lower end of the shock absorber 75 is fastened to the lug 23 of the upper support 20 by a conical bolt and the respective washers and nuts.

The torsion spring assembly is assembled onto the vehicle substantially as shown in FIG. 3. In the end view of FIG. 3, the rear axle 15 of the vehicle extends transversely to the axis of the torsion spring assembly 12. As can be seen, the weight of the vehicle causes a downward torque on the suspension arms 46 and the adjusting arm 47 which are fixed to the steel shaft 13 of the torsion spring assembly 12. The torque is transferred from the suspension arm 46 and the shaft 13 to the rubber body 14 in a clockwise direction as viewed in FIG. 3. Since the steel covering 15 of the spring assembly 12 is fixed to the axle, and thus prevented from rotating with respect to the axle, the torque is absorbed by the rubber body 14.

The weight of the vehicle eventually will cause permanent deformation of the rubber body 14. The shaft and the suspension arm will thus assume a position clockwise of the position shown in FIG. 3. As the rubber body 14 deforms, the vehicle frame 86 will assume a position lower to the ground. The height of the vehicle frame 86 with respect to the ground and the rear axle can be adjusted by tightening the nut 56 on the tension bolt 50. As the bolt 56 is tightened to draw the suspension arm 46 upward toward the adjustment arm 47, the height of the frame will be increased.

The rubber body 14 may deform to such an extent that tightening the tension bolt 50 does not increase the height of the vehicle frame to a desired level. In that event, the U-bolts 60 are removed to remove the suspension arm 46 from the spring shaft 13. Once the arm 46 is removed, the tension arm 47 can be removed from the hexagonal blocks 16 and replaced in a different angular position on the shaft 13 to compensate for the deformation of the rubber body 14. The suspension arm 46 is then reassembled onto the spring shaft 13 and the tension arm 47 and bolt 50 adjusted to position the vehicle frame at the desired height from the ground.

The shock absorber system constituted by the shock absorbers 75, has as its main purpose, to absorb the rebound and backward motion of the tension spring assembly 12 produced by the stored momentary energy or oscillation that results from constant operations of the suspension spring system.

Even though a preferred embodiment of the rear suspension has been described, it shall be understood that it can have variations in realization without this meaning a departure from the inventive concept here described. It will be obvious for an expert in the material that the proposals here made must be considered solely an exemplification and by no means restrictive.

What is claimed is:

1. A rear torsion suspension assembly for a vehicle comprising:
   an elongated shaft having first and second ends and a substantially circular cross-sectional shape;
   first and second hexagonal lug means fixed to said shaft and spaced from said first and second ends;
   a vulcanized, solid rubber torsion body surrounding and fixed to said shaft between said first and second lug means, said rubber body having a substantially square cross-section, four sheet steel angle members attached to said rubber body forming an inner sheath having a central groove extending around the perimeter;
   a rigid sheath surrounding said inner sheath and said rubber body, said rigid sheath having a substantially square cross-section, said rigid sheath having at least two opposing faces and means defining an aperture in each of said faces;
   bolt means extending through said aperture in said rigid sheath and through said central groove, said bolt means engaging said rubber body to resist longitudinal movement of the rubber body with respect to the sheath;
   means for rigidly coupling said sheath to an axle of a vehicle;
   first and second tension adjusting arms, each arm having a hexagonal orifice for removably coupling said arms to each of said lug means, said tension arms extending radially outward from said shaft;
   first and second suspension arms having a first end coupled to each end of said shaft adjacent said lugs, and a second end of each suspension arm being further coupled to a frame of said vehicle; and
   adjustable tension means coupled to said tension arm and to said suspension arm to adjust the angular position of said shaft with respect to said suspension arm.

2. The suspension assembly in accordance with claim 1, and further comprising a support assembly comprising an upper support and a lower support and means to clamp said upper and lower supports together around said sheath.

3. The suspension assembly in accordance with claim 2, and further comprising a mounting plate, said means for coupling said sheath to said axle comprising a pair of U-shaped bolts extending around said upper support and having ends extending through apertures in said mounting plate, said axle being clamped between said mounting plate and said lower support.

4. The suspension assembly in accordance with claim 2, said upper and lower supports having a substantially U-shaped longitudinal channel receiving said sheath and outwardly extending longitudinal flanges, said upper and lower supports being coupled together along said flanges, said longitudinal channel having a plurality of recesses arranged transversely to receive said bolt means in said sheath to resist longitudinal movement of said spring assembly with respect to said upper and lower supports.

5. The suspension assembly in accordance with claim 4, further comprising U-shaped bolts extending through apertures in said flanges of said upper and lower supports to fasten the upper and lower supports to said axle.

6. The suspension assembly in accordance with claim 2, and further comprising shock absorber means having a first end coupled to said frame of said vehicle and a second end coupled to said upper support.

7. The suspension assembly in accordance with claim 2, said upper support including a peripheral groove to receive a U-shaped bolt for coupling said upper and lower supports to said axle.

8. The suspension assembly in accordance with claim 2, and further comprising bumper means coupled to said upper support for contacting a corresponding bumper means on said frame.

9. The suspension assembly in accordance with claim 1, further comprising linkage means pivotally connecting said second end of said suspension arm to said frame of said vehicle.

10. The suspension assembly in accordance with claim 1, and further comprising U-bolt means coupling said first end of said suspension arm to said shaft.

11. The suspension assembly in accordance with claim 1, said tension means comprising a tension bolt having a first end coupled to said tension arm and a second end coupled to said suspension arm, said tension means further including means to adjust the position of said tension arm relative to said suspension arm.

12. A rear torsion suspension assembly for a vehicle comprising:
   a torsion spring including an elongated shaft having first and second ends, first and second hexagonal lug means fixed to said shaft and spaced from said first and second ends, a rubber torsion body surrounding and fixed to said shaft, said rubber body having a substantially square cross-section, four sheet steel angle members attached to said rubber body to define an inner steel sheath having a central groove extending around the perimeter of said rubber body, a rigid sheath surrounding said inner sheath and said rubber body, said rigid sheath having a substantially square cross section, and at least two opposing faces including means defining a plurality of apertures in said faces, and bolt means extending through said apertures for coupling said rubber body to said inner sheath and said rigid sheath;
   means for rigidly coupling said torsion spring to an axle of a vehicle, said coupling means including a support assembly comprising an upper support and a lower support, each said support having a longitudinal channel, each said channels having a plurality of recesses and means to clamp said upper and lower supports together around said rigid sheath whereby said bolt means coupling said rubber body to said rigid sheath are received in said recesses to resist longitudinal movement of said torsion spring with respect to said support assembly;

first and second tension adjusting arms having hexagonal orifices removably coupled to each of said lug means and selectively adjustable with respect to said shaft, said tension arms extending radially outward from said shaft;

first and second suspension arms having a first end coupled to each end of said shaft adjacent said lugs, and a second end of each suspension arm being further coupled to a frame of said vehicle; and adjustable tension means coupled to said tension arm and to said suspension arm to adjust the angular position of said shaft with respect to said suspension arm.

13. The suspension assembly in accordance with claim 12, further comprising linkage means pivotally connecting said second end of said suspension arm to said frame of said vehicle.

14. The suspension assembly in accordance with claim 12, said tension means comprising a tension bolt having a first end coupled to said tension arm and a second end coupled to said suspension arm, said tension means further including means to adjust the position of said tension arm relative to said suspension arm.

* * * * *